United States Patent [19]
Hutchinson

[11] Patent Number: 5,664,886
[45] Date of Patent: Sep. 9, 1997

[54] DEBRIS CAPTURING LAWN NET

[76] Inventor: Dan A. Hutchinson, 7435 Cardwell, Westland, Mich. 48185

[21] Appl. No.: 629,018

[22] Filed: Apr. 8, 1996

[51] Int. Cl.[6] .......... B65D 30/06; B65D 33/02; B65D 33/28
[52] U.S. Cl. .......... 383/4; 220/9.2; 383/76; 383/117; 383/119
[58] Field of Search .......... 383/4, 117, 119, 383/76; 220/9.2, 9.3

[56] References Cited

U.S. PATENT DOCUMENTS

| | | | |
|---|---|---|---|
| 1,087,702 | 2/1914 | Van Patten | 383/119 |
| 2,766,797 | 10/1956 | Cowen | 383/4 |
| 4,366,949 | 1/1983 | Staub, Sr. | 383/4 |
| 4,561,480 | 12/1985 | Underwood et al. | 383/4 |
| 4,602,664 | 7/1986 | Hullen | 383/4 |
| 4,693,504 | 9/1987 | Baker | 383/4 |
| 5,024,344 | 6/1991 | Paula | 383/119 |
| 5,417,462 | 5/1995 | Hensley | 383/4 |

*Primary Examiner*—Stephen P. Garbe

[57] ABSTRACT

A net for collecting leaves from a lawn. The inventive device includes a capturing web positionable in a flat orientation over a lawn. A closure assembly is mounted to the web and operates to pivot an outer peripheral edge of the web upwardly from the lawn and subsequently inwardly to trap debris in the net for disposal thereof.

9 Claims, 3 Drawing Sheets

DEBRIS CAPTURING LAWN NET

BACKGROUND OF THE INVENTION

1. Field of the Invention

The present invention relates to debris collecting structures and more particularly pertains to a debris capturing lawn net for collecting leaves from a lawn.

2. Description of the Prior Art

The use of debris collecting structures is known in the prior art. More specifically, debris collecting structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art debris collecting structures include U.S. Pat. No. 4,366,949; U.S. Pat. No. 5,289,670; U.S. Pat. Des. No. 349,593; U.S. Pat. Des. No. 299,979; U.S. Pat. No. 327,345; and U.S. Pat. Des. No. 291,133.

While these devices fulfill their respective, particular objectives and requirements, the aforementioned patents do not disclose a debris capturing lawn net for collecting leaves from a lawn which includes a capturing web positionable in a flat orientation over a lawn, and a closure means mounted to the web for pivoting an outer peripheral edge of web upwardly from the lawn and subsequently inwardly to trap debris in the net for disposal thereof.

In these respects, the debris capturing lawn net according to the present invention substantially departs from the conventional concepts and designs of the prior art, and in so doing provides an apparatus primarily developed for the purpose of collecting leaves from a lawn.

SUMMARY OF THE INVENTION

In view of the foregoing disadvantages inherent in the known types of debris collecting structures now present in the prior art the present invention provides a new debris capturing lawn net construction wherein the same can be utilized for collecting and transporting leaves from a lawn. As such, the general purpose of the present invention, which will be described subsequently in greater detail, is to provide a new debris capturing lawn net apparatus and method which has many of the advantages of the debris collecting structures mentioned heretofore and many novel features that result in a debris capturing lawn net which is not anticipated, rendered obvious, suggested, or even implied by any of the prior art debris collecting structures, either alone or in any combination thereof.

To attain this, the present invention generally comprises a net for collecting leaves from a lawn. The inventive device includes a capturing web positionable in a flat orientation over a lawn. A closure assembly is mounted to the web and operates to pivot an outer peripheral edge of the web upwardly from the lawn and subsequently inwardly to trap debris in the net for disposal thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to,enable the U.S. Patent and Trademark Office and the public generally, and especially the scientists, engineers and practitioners in the an who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new debris capturing lawn net apparatus and method which has many of the advantages of the debris collecting structures mentioned heretofore and many novel features that result in a debris capturing lawn net which is not anticipated, rendered obvious, suggested, or even implied by any of the prior art tool guides, either alone or in any combination thereof.

It is another object of the present invention to provide a new debris capturing lawn net which may be easily and efficiently manufactured and marketed.

It is a further object of the present invention to provide a new debris capturing lawn net which is of a durable and reliable construction.

An even further object of the present invention is to provide a new debris capturing lawn net which is susceptible of a low cost of manufacture with regard to both materials and labor, and which accordingly is then susceptible of low prices of sale to the consuming public, thereby making such debris capturing lawn nets economically available to the buying public.

Still yet another object of the present invention is to provide a new debris capturing lawn net which provides in the apparatuses and methods of the prior art some of the advantages thereof, while simultaneously overcoming some of the disadvantages normally associated therewith.

Still another object of the present invention is to provide a new debris capturing lawn net for collecting leaves from a lawn.

Yet another object of the present invention is to provide a new debris capturing lawn net which includes a capturing web positionable in a flat orientation over a lawn, and a closure means mounted to the web for pivoting an outer peripheral edge of web upwardly from the lawn and subsequently inwardly to trap debris in the net for disposal thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
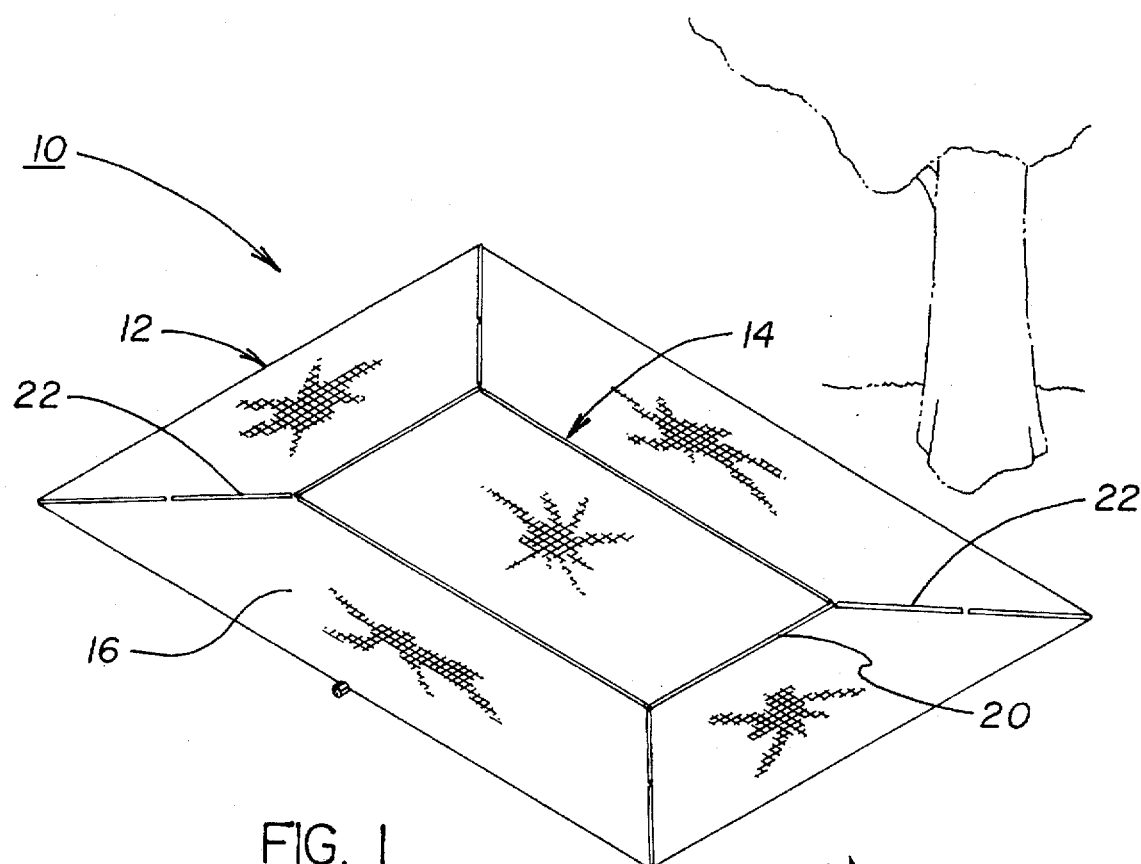
FIG. 1 is an isometric illustration of a debris capturing lawn net according to the present invention in use.

With reference now to the drawings, and in particular to FIGS. 1–9 thereof, a new debris capturing lawn net embodying the principles and concepts of the present invention and generally designated by the reference numeral 10 will be described.

Figure 2:
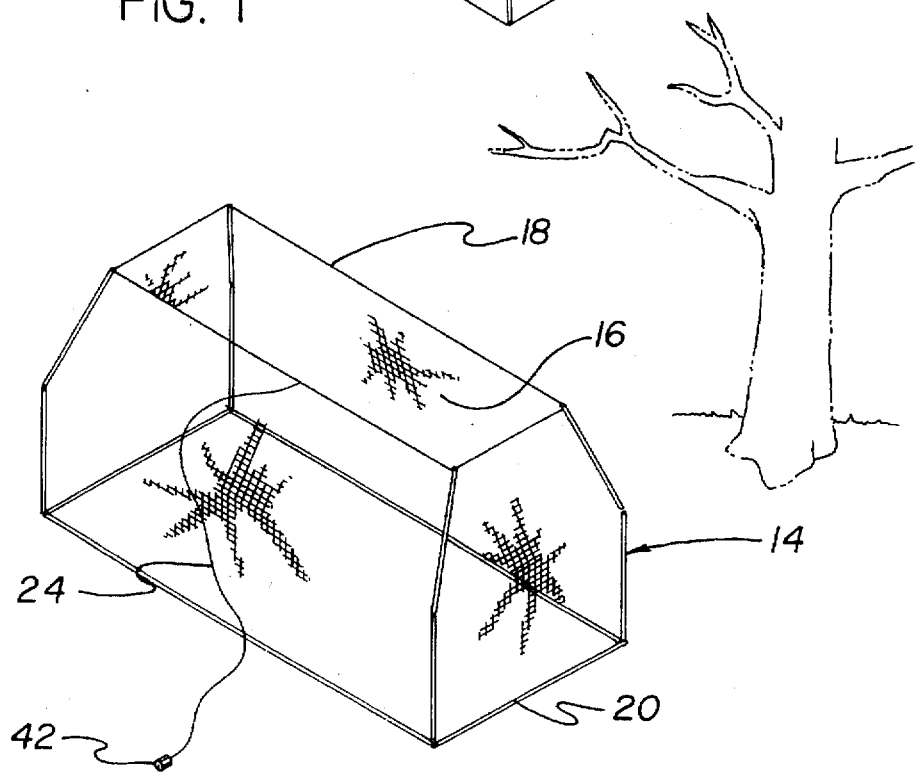
FIG. 2 is a further isometric illustration of the invention in use.

More specifically, it will be noted that the debris capturing lawn net 10 comprises a capturing means 12 for positioning over a ground surface or lawn, as shown in FIG. 1, and for receiving leaves and other debris thereon. A closure means 14 is operatively coupled to the capturing means 12 for effecting closing of the capturing means 12 about debris positioned thereon as shown in FIG. 2 of the drawings. By this structure, leaves or other debris positioned upon the capturing means 12 can be enclosed thereby and subsequently disposed of.

As shown in FIGS. 1 through 5, the capturing means 12 of the present invention 10 preferably comprises a mesh web 16 having an outer peripheral edge 18 extending thereabout. The mesh web 16 is of a flexible construction and can be laid out upon a ground surface or lawn as shown in FIG. 1 of the drawings. If desired, a plurality of the debris capturing lawn nets 10 can be positioned about a tree so as to capture leaves falling from various sides thereof.

With continuing reference to FIGS. 1 through 5, it can be shown that the closure means 14 of the invention 10 preferably comprises a base frame 20 mounted to a central portion of the mesh web 16 of the capturing means 12. A plurality of arms 22 pivotally extend from the base frame 20 towards the outer peripheral edge 18 of the mesh web 16. A closure loop 24 is coupled to the outer peripheral edge 18 of the mesh web 16 and extends thereabout such that a manual tensioning of the closure loop 24 will cause the outer peripheral edge 18 to shorten in overall length. By this structure, a pulling of the closure loop 24 will effect pivoting of the arms upwardly from the ground surface or lawn to cause the capturing means 12 to close in about debris positioned upon the mesh web 16.

Figure 3:
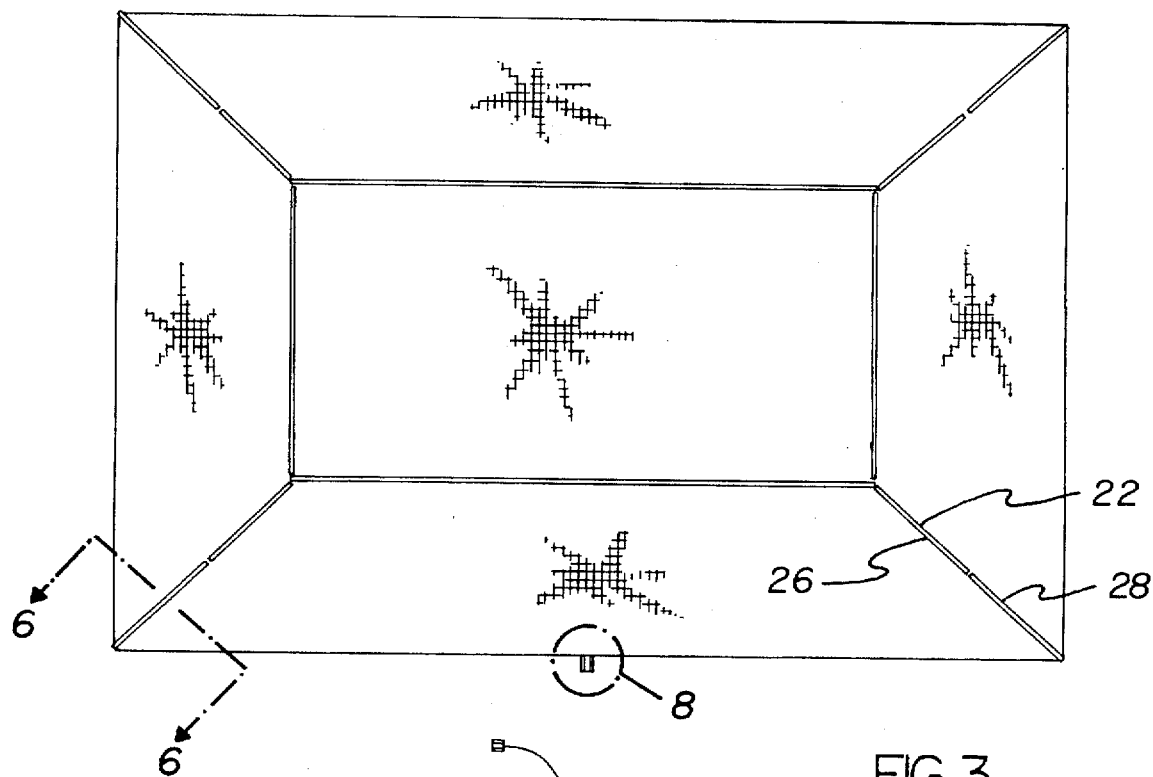
FIG. 3 is a top plan view of the invention, per se.
Figure 4:
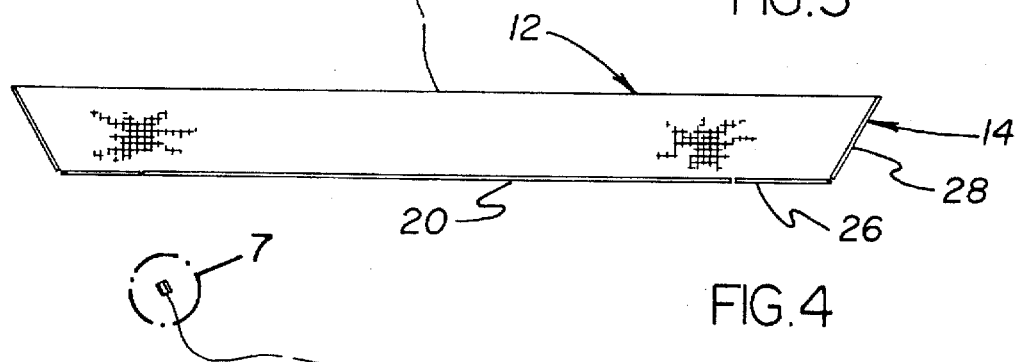
FIG. 4 is an elevation view thereof.
Figure 5:
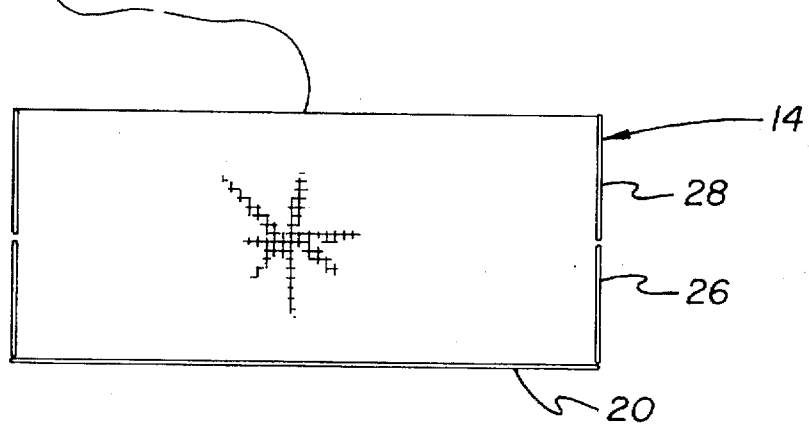
FIG. 5 is a further elevation view of the invention.

Preferably, the base frame 20 is substantially square or rectangular in shape, with the outer peripheral edge 18 of the mesh web 16 being correspondingly shaped such that the outer peripheral edge 18 is positioned a fixed and predetermined distance from the base frame 20. Further, it is preferable that the arms 22, as shown in FIGS. 3 through 5, each comprise an inner arm 26 pivotally mounted relative to the base frame 20 and extending outwardly therefrom. An outer arm 28 is pivotally mounted relative to the inner arm 26 and continues outwardly therefrom towards the outer peripheral edges of the mesh web 16. The arms 22 preferably project from corners of the base frame 20 towards corners of the outer peripheral edge 18 of the mesh web 16 as shown in the Figures. By this structure, a tensioning of the closure loop 24 will initially cause the outer arm 28 to pivot into the orientation illustrated in FIG. 4. Further tensioning of the closure loop 24 will subsequently effect pivoting of the inner arms 26 into the position illustrated in FIG. 5 of the drawings. By this structure, the outer peripheral edge 18 of the mesh web 16 is initially lifted from the ground and subsequently folded inwardly upon the mesh web 16 to capture the debris within an enclosure formed of the mesh web 16 as shown in FIG. 2 of the drawings.

Figure 9:
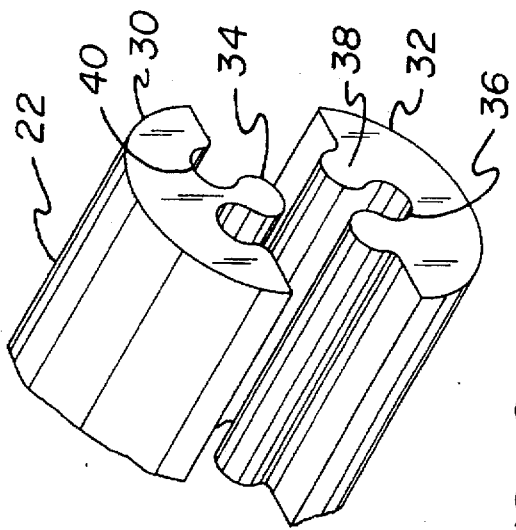
FIG. 9 is an exploded isometric illustration of a portion of an arm of the invention.
Figure 6:
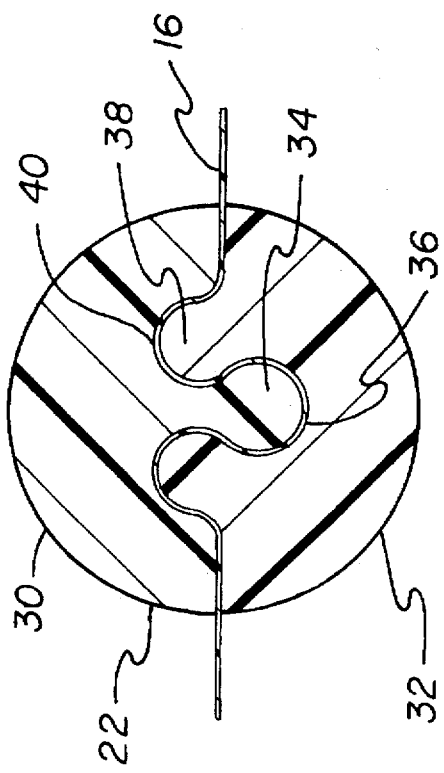
FIG. 6 is a cross-sectional view taken along line 6—6 of FIG. 3.

Referring now to FIGS. 6 and 9, it can be shown that the base frame 20 as well as the arm 22 are each comprised of an upper portion 30 removably secured to a lower portion 32 so as to capture the mesh web 16 of the capturing means 12 therebetween. To this end, the upper portion 30 is preferably shaped so as to define an upper portion projection 34 extending therefrom which is resiliently received within a lower portion cavity 36 extending into the lower portion 32. If desired, one or more lower portion projections 38 can extend from the lower portion 32 for reception within one or more upper portion cavities 40 of the upper portion 30 so as to further secure the portions 30 and 32 together as shown for one of the arms 22 in FIGS. 6 and 9 of the drawings. By this structure, the base frame 20 and the arms 22 can be easily secured to the mesh webs 16 during construction of the present invention 10.

Figure 7:
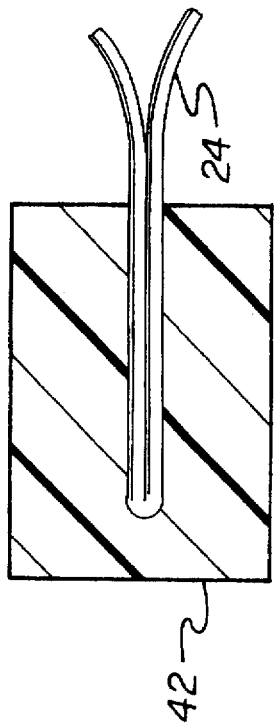
FIG. 7 is a cross-sectional view of the area set forth in FIG. 5.
Figure 8:
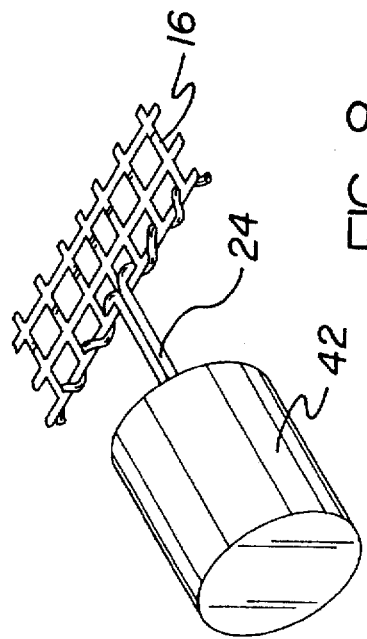
FIG. 8 is an isometric illustration of the area set forth in FIG. 3.

Referring now to FIGS. 7 and 8, it can be shown that the closure loop 24 terminates in a pull knob 42 which can be manually grasped and manipulated to effect tensioning of the closure loop 24 to operate the closure means 14 as described above. As shown in FIG. 8, the closure loop preferably extends through apertures in the mesh web 16 along the length of the outer peripheral edge 18 thereof. By this structure, a tensioning of the closure loop 24 will effect a reduction in the length of the outer peripheral edge 18 through a gathering thereof so as to cause the device 10 to assume the orientation illustrated in FIG. 2.

In use, the debris capturing lawn net 10 of the present invention can be easily utilized to effect reception and enclosure of debris such as leaves or the like within the device 10 as illustrated in FIGS. 1 and 2 of the drawings. The entire device 10 may be constructed of a disposable material such that the invention loaded with debris and leaves can be simply disposed of in a manner similar to that of a conventionally known lawn bag. The present invention 10 is preferably constructed of a biodegradable or polymeric material which is substantially green in color so as to blend in with the associated ground surface or lawn.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A debris capturing lawn net comprising:

a capturing means for positioning over a ground surface and for receiving leaves and debris thereon;

a closure means operatively coupled to the capturing means for effecting closing of the capturing means about leaves and debris when positioned thereon, the closure means comprises a base frame mounted to a portion of the mesh web of the capturing means; a plurality of arms pivotally mounted to and extending from the base frame towards the outer peripheral edge of the mesh web; a closure loop coupled to the outer peripheral edge of the mesh web and extending thereabout, wherein a tensioning of the closure loop will effect pivoting of the arms upwardly from the ground surface to cause the capturing means to close in about debris when positioned upon the mesh web.

2. The debris capturing lawn net of claim 1, wherein the base frame is substantially rectangular in shape, with the outer peripheral edge of the mesh web being correspondingly shaped such that the outer peripheral edge is positioned a predetermined distance from the base frame.

3. The debris capturing lawn net of claim 2, wherein the arms each extend from a corner of the base frame towards a corner of the mesh web.

4. The debris capturing lawn net of claim 3, wherein the arms each comprise an inner arm pivotally mounted relative to the base frame and extending outwardly therefrom; an outer arm pivotally mounted and substantially colinearly oriented relative to the inner arm, the outer arm projecting outwardly from the base frame towards the outer peripheral edges of the mesh web.

5. The debris capturing lawn net of claim 4, wherein the base frame and the arms are each comprised of an upper portion removably secured to a lower portion so as to capture the mesh web of the capturing means therebetween.

6. The debris capturing lawn net of claim 5, wherein the upper portions are each shaped so as to define an upper portion projection extending therefrom which is resiliently received within a lower portion cavity extending into a respective lower portion.

7. The debris capturing lawn net of claim 6, wherein the lower portions are each shaped so as to define a lower portion projection extending therefrom received within an upper portion cavity of the upper portion.

8. The debris capturing lawn net of claim 7, wherein the closure loop terminates in a pull knob which can be manually grasped and manipulated to effect tensioning of the closure loop to operate the closure means.

9. The debris capturing lawn net of claim 8, wherein the closure loop extends through apertures in the mesh web along a length of the outer peripheral edge thereof.

* * * * *